United States Patent [19]

Morawski

[11] 4,067,586

[45] Jan. 10, 1978

[54] DIAPHRAGM CHUCK

[75] Inventor: London T. Morawski, Mount Clemens, Mich.

[73] Assignee: MP Tool & Engineering Company, Warren, Mich.

[21] Appl. No.: 743,045

[22] Filed: Nov. 18, 1976

[51] Int. Cl.² .............................................. B23B 31/32
[52] U.S. Cl. ................................... 279/1 D; 279/1 A; 279/1 G; 279/4
[58] Field of Search .................. 279/1 D, 1 A, 1 G, 4

[56] References Cited

U.S. PATENT DOCUMENTS 3,006,653  10/1961  Benjamin et al. ............... 279/1 D
3,479,042  11/1969  Hohwart .......................... 279/1 G Primary Examiner—Z. R. Bilinsky
Attorney, Agent, or Firm—Barnes, Kisselle, Raisch & Choate

[57] ABSTRACT

A diaphragm chuck having a plurality of circumferentially spaced jaws fixedly mounted on the diaphragm and a ring releasably interengaged with the jaws. The ring has a plurality of radially movable pins thereon which, when the diaphragm is flexed, are adapted to be displaced radially into and out of clamping engagement with a workpiece.

10 Claims, 6 Drawing Figures

DIAPHRAGM CHUCK

This invention relates to diaphragm chucks.

Conventional diaphragm chucks have a plurality of jaws thereon which, when the diaphragm is flexed by means of a suitable actuator, are adapted to firmly grip and clamp a workpiece on the chuck. To chuck a workpiece of a different size normally requires either changing the jaws or utilizing a different chuck.

The primary object of the present invention resides in the provision of a diaphragm chuck which is readily adapted for use with workpieces of different sizes.

A more specific object of the present invention resides in the provision of a diaphragm chuck having a plurality of jaws fixed on the diaphragm which are adapted to receive and cooperate with any of several workpiece clamping rings, each of which is designed for a workpiece of a specific size or shape so that different workpieces can be clamped with the same chuck by simply substituting one clamping ring for another.

A further object of the present invention is to provide a chuck utilizing one of several accessory clamping rings which are readily engaged with and disengaged from the jaws of the chuck and which, when actuated to clamp a workpiece, positively urges the workpiece into abutting engagement with a locator fixedly mounted on the chuck.

Other objects, features and advantages of the present invention will become apparent from the following description and accompanying drawings, in which.

Figure 1:
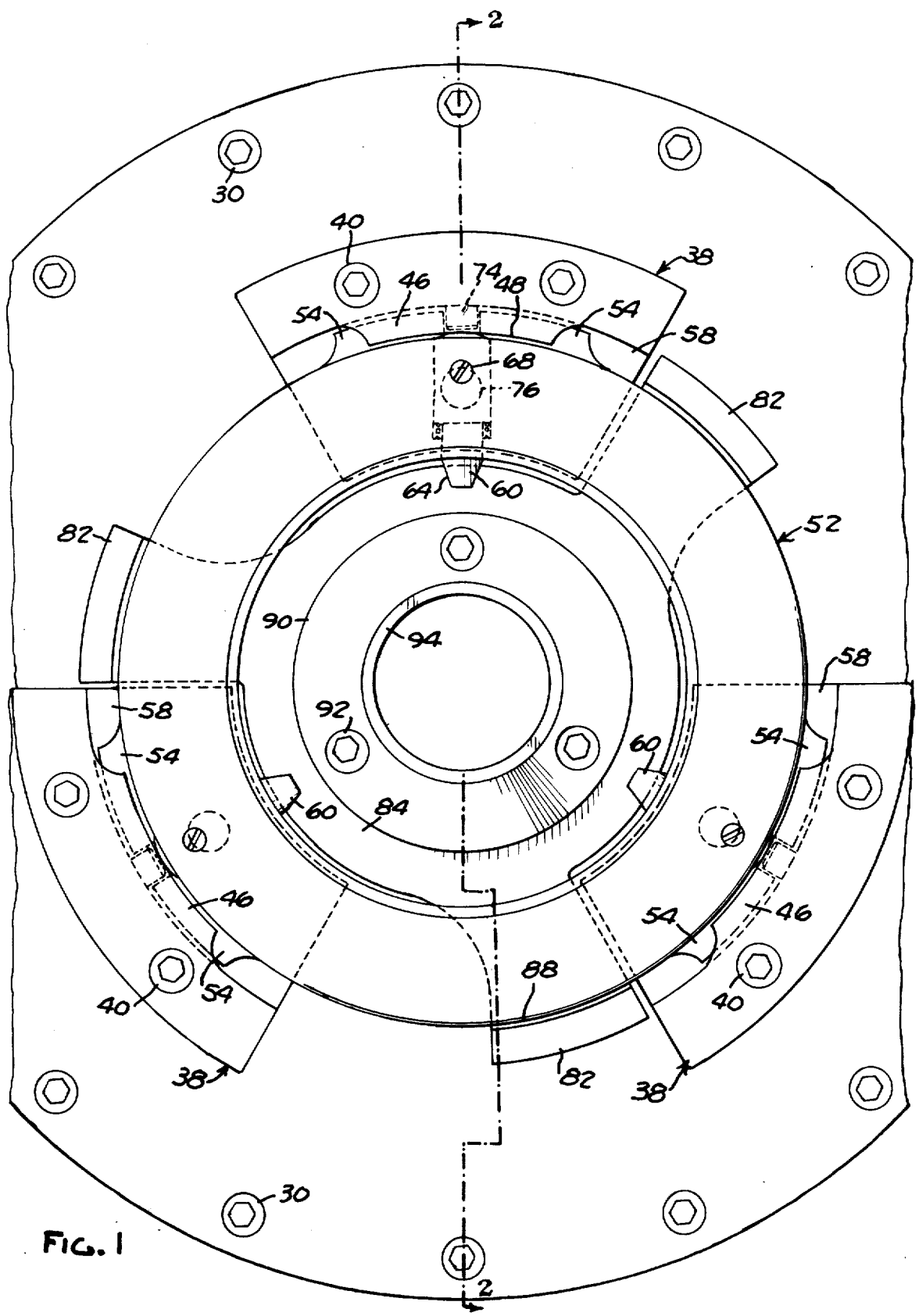
FIG. 1 is a fragmentary end view of a chuck embodying the present invention.
Figure 2:
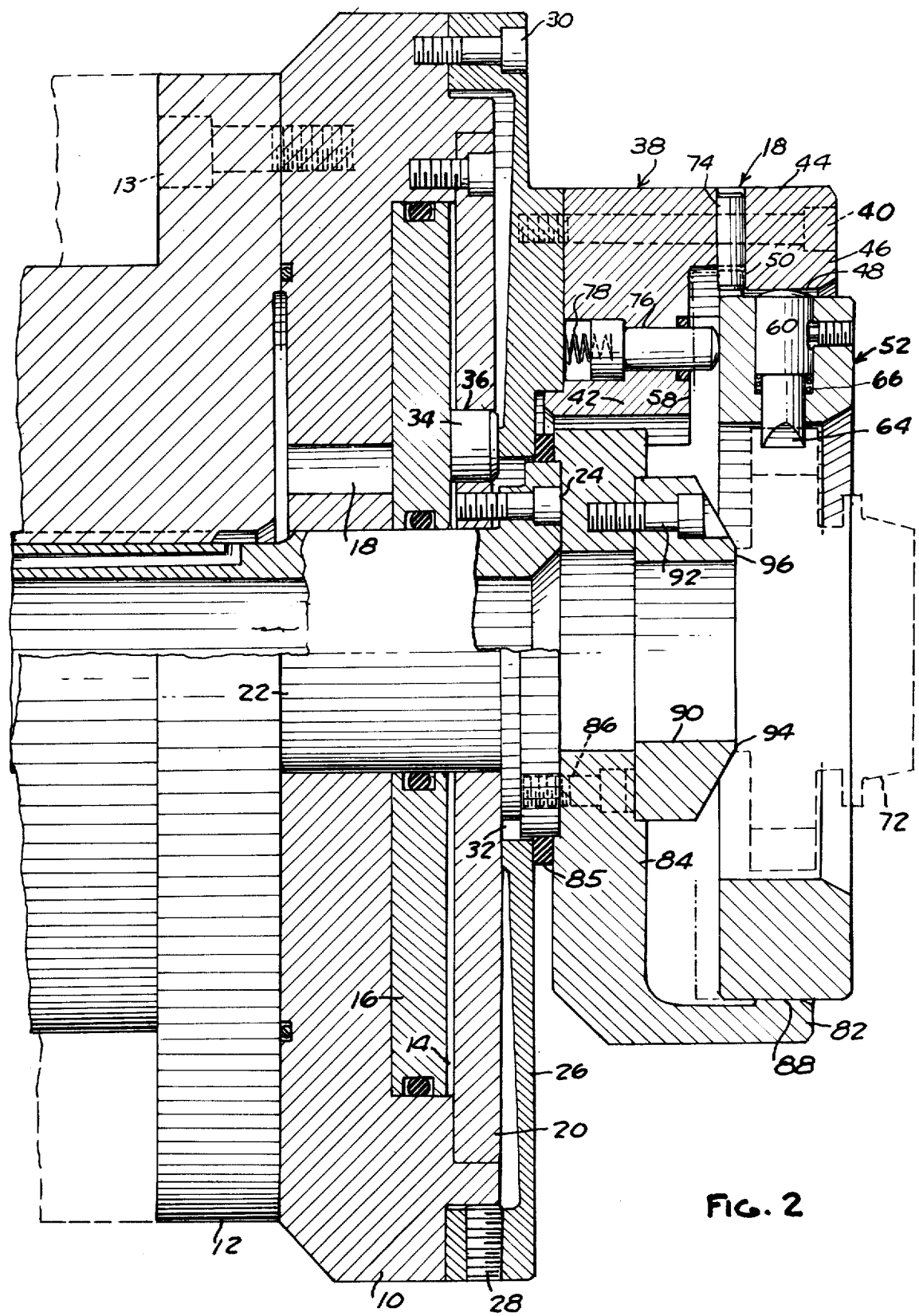
FIG. 2 is a sectional view along line 2—2 in FIG. 1.

Referring to FIGS. 1 and 2, the chuck includes a chuck body 10 adapted to be fixedly mounted on the spindle 12 of a machine tool as by screws 13. Body 10 is formed with a cylinder chamber 14 in which a piston 16 is arranged for axial sliding movement. Air is adapted to be directed to chamber 14 at the back side of piston 16 by suitable passageways 18. The front side of chamber 14 is closed by a cover plate 20. Piston 16 is slideably guided in chamber 14 by a central shaft 22 fixedly supported on body 10 by screws 24. At the axially outer face of body 10 there is mounted a conventional resiliently flexible diaphragm 26. Diaphragm 26 is centered axially on body 10 by adjusting screws 28 and is rigidly connected to the body around its outer periphery by screws 30. Shaft 22 extends axially through a central aperture 32 in the diaphragm. Piston 16 has a plurality of pins 34 on the front face thereof projecting axially through openings 36 in cover plate 20 and engaging the diaphragm around the central opening 32. Thus, when air under pressure is directed against the back side of piston 16, the piston is displaced axially forwardly and pins 34 flex the diaphragm axially forwardly about its outer periphery as a fulcrum.

Three jaws 38 are fixedly mounted on diaphragm 26 by screws 40. Jaws 38 are equally spaced concentrically about the central axis of body 10. Each jaw has a base 42 formed with an axially forwardly extending leg 44. Legs 44 have radially inwardly extending flanges 46. Each flange 46 has an arcuate, radially inner face 48 and a back face 50. The arcuate faces 48 are ground concentric to the central axis of the chuck and the back faces 50 are ground so that they all lie in the same plane perpendicular to the axis of the chuck.

Figure 3:
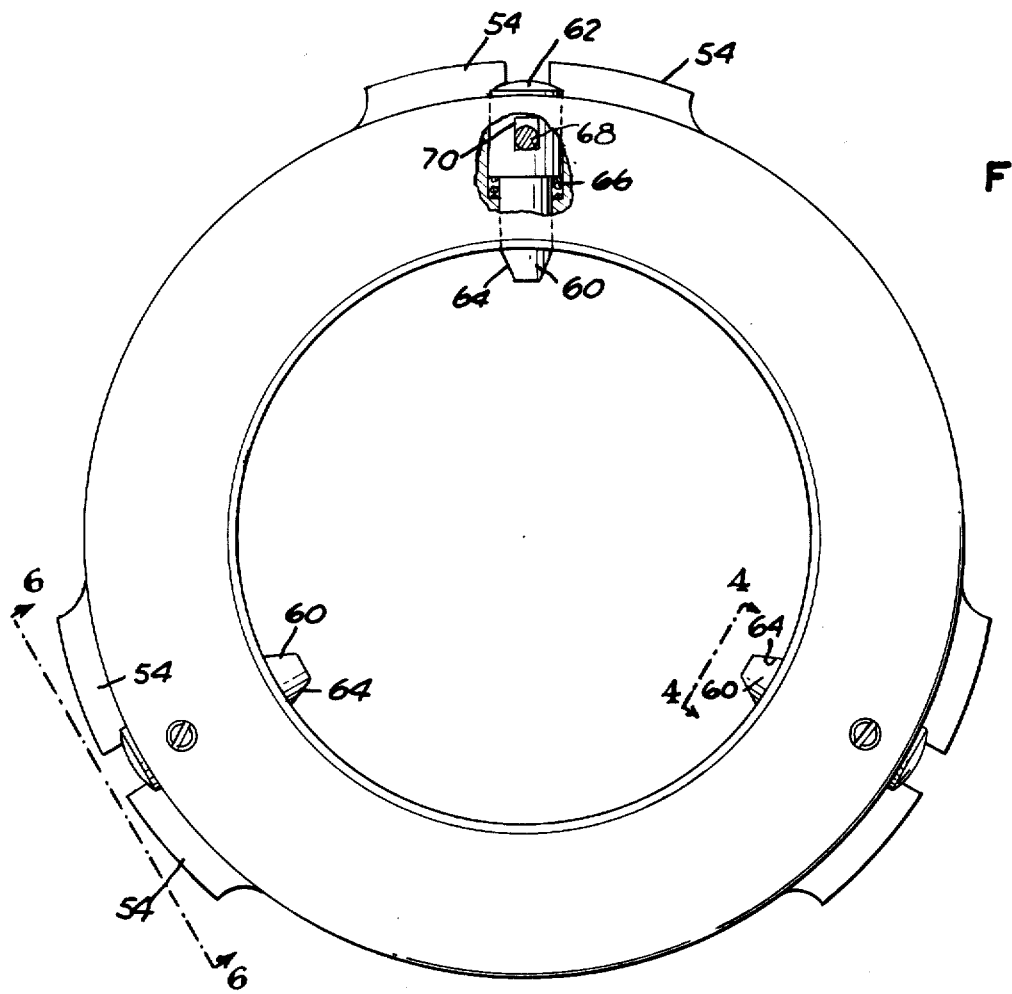
FIG. 3 is a plan view of the clamping pin ring of the chuck.
Figure 4:
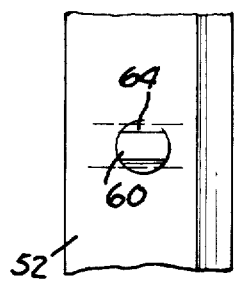
FIG. 4 is a fragmentary sectional view taken along line 4—4 in FIG. 3.
Figure 5:
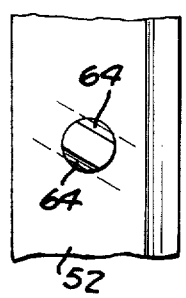
FIG. 5 is a view similar to FIG. 4 and showing a slightly modified clamp pin.
Figure 6:
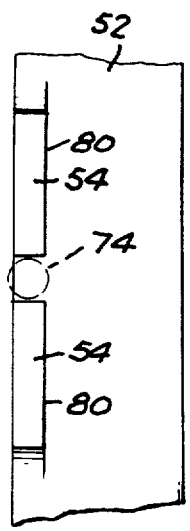
FIG. 6 is a fragmentary sectional view along line 6—6 in FIG. 3.

A pin ring 52 adapted to be engaged with jaws 38 is illustrated in FIG. 3. Ring 52 has an outer diameter slightly less than the diameter of the circle defined by the arcuate faces 48 on jaws 38. Adjacent one side thereof ring 52 is provided with three sets of radially outwardly extending flanges 54, the flanges in each set being spaced apart slightly to form a gap or notch therebetween, as at 56. The circumferential spacing of the three sets of flanges 54 corresponds to the circumferential spacing of flanges 46 on jaws 38. The axial thickness of flanges 54 is considerably less than the axial spacing between the flat back faces 50 of flanges 46 and the front faces 58 of the bases 42 of jaws 38. Three pins 60 are mounted on ring 52 for radial movement thereon. Each pin 60 is generally radially aligned with a notch 56. Pins 60 have a length greater than the radial thickness of ring 52 and are arranged thereon so that their outer ends 62 project outwardly beyond the outer periphery of ring 52 and their inner ends 64 project inwardly beyond the inner periphery of ring 52. Each pin 60 is biased in a radially outwardly direction by a spring 66 and the extent to which each pin is permitted to move in a radially outwardly direction is limited by a screw 68 engaging a slot 70 in the pin. The inner ends 64 of pins 60 are shaped to conform with the surface of the workpiece to be gripped. Thus, if the workpiece (designated 72 in FIG. 2) is a gear, the ends 64 of the pins can be generally wedge-shaped to engage between successive teeth of the gear. If the teeth of the gear are helical, then the wedge-shaped end of the pin can be correspondingly inclined as shown in FIG. 6 to mesh with such helical teeth.

Each jaw 38 has a radially extending pin 74 thereon, the inner end of which underlies flange 46 on the jaw. Pins 74 are adapted to register radially with the notches 56 between the flanges 54 in each set on ring 52. Each jaw 38 is also provided with a pin 76 which extends axially forwardly from the front face 58 of base 42. Pins 76 are biased in an axially forward direction by springs 78. The above described arrangement is such that, when ring 52 is rotated to a position wherein the flanges 54 thereon are located between the successive flanges 46 on the three jaws, the ring may be inserted within the jaws to a position wherein the front faces of flanges 54 are located behind the plane of pins 74. Ring 52 may then be rotated to align notches 56 with pins 74. Thereafter, when the ring is released, pins 76 will shift the ring axially outwardly to interengage pins 74 with notches 56. When so arranged pins 76 press ring 52 axially outwardly so that the front faces 80 of flanges 54 are biased into abutting engagement with the flat back faces 50 of flanges 46. At the same time, the outer ends 62 of pins 60 are engaged by the arcuate faces 48 of flanges 46 so that the pins are displaced inwardly at least a slight extend against the bias of springs 66.

Ring 52 is retained in a position accurately concentric with the axis of the chuck by means of three positioning fingers 82 which extend axially forwardly from and are formed integrally with a ring 84. Ring 84 is fixedly mounted to shaft 22 by screws 86. A compressible seal 85 between ring 84 and diaphragm 26 accomodates flexing of the diaphragm. Fingers 82 have accurately ground, radially inner surfaces 88 which define a circle accurately corresponding to the outer diameter of ring 52. The accurately ground surfaces 88 lie generally in the same axial plane as flanges 46 of jaws 38. The workpiece locator 90 is mounted on ring 84 by screws 92. The axially forward face 94 of locator 90 is shaped to engage with a rear locating face 96 on the workpiece. When the faces 94, 96 are in coplanar engagement, the workpiece 72 is located axially on the chuck in the desired predetermined position.

With the above described arrangement it will be observed that ring 84, and, consequently, fingers 82 and locator 90 are rigidly fixed to the support body 10. On the other hand, the jaws 38 are mounted on the diaphragm and are movable in response to flexing of the diaphragm. Thus, if sufficient pressure is applied to the back side of piston 16, the piston flexes the diaphragm axially forwardly and the arcuate faces 48 on the flanges 46 of the jaws are accordingly displaced radially outwardly in an arcuate path. Since pins 60 are biased in a radially outwardly direction, it follows that the circle defined by the inner ends of the pins is enlarged to accommodate the insertion of a workpiece 72 into ring 52. Thereafter, when the pressure on piston 16 is relieved, diaphragm 26 flexes back toward its free position which causes the outer ends of the jaws to swing inwardly and rearwardly in an arcuate path. As the jaws swing inwardly, pins 60 are likewise displaced radially inwardly to firmly grip the workpiece. At the same time, the flat back faces 50 on the jaws displace ring 52 as a whole axially rearwardly so that the face 96 of workpiece 72 is brought into abutting coplanar engagement with the face 94 on locator 90.

When it is desired to use the chuck for gripping a larger or smaller workpiece, it is only necessary to remove ring 52 and replace it with another ring of similar construction having pins thereon dimensioned to accommodate the new workpiece. It will be appreciated that, although the chuck illustrated is designed for gripping a workpiece around its outer periphery, the chuck can be modified in an obvious manner for gripping a workpiece around its inner periphery. In the latter case ring 52 would be located around the outer sides of the jaws and the diaphragm would be flexed in the opposite direction to actuate pins 60 to the workgripping position. In either event, the workpiece would be firmly clamped and pulled back into engagement with the locating face 94 on locator 90.

I claim:

1. A diaphragm chuck comprising a support having a central axis, a generally circular, resiliently flexible diaphragm concentric with said central axis and having its outer periphery fixedly connected to said support, actuator means on said support engageable with the diaphragm for flexing it axially about its periphery as a fulcrum, a plurality of circumferentially spaced individual jaws fixedly mounted on the diaphragm around a circle concentric with said central axis, jaws being disposed radially inwardly from the outer periphery thereof and projecting axially outwardly from said diaphragm, the axially outer end portions of said jaws being displaced radially in an arcuate path in response to flexing of the diaphragm, a circumferentially continuous ring, means releasably mounting said ring on said jaws in a circumferentially fixed position, said ring having a plurality of radially movable pins thereon registering with said jaws, said jaws having axially extending shoulders thereon engaging one end of said pins, the opposite ends of said pins having means thereon for gripping a peripheral surface of a workpiece whereby, when the diaphragm is flexed axially in one direction, said pins are retracted sufficiently to receive a workpiece and, thereafter, when the diaphragm is flexed axially in the opposite direction, the axially extending shoulders on said jaws displace said pins radially to firmly clamp the workpiece and means on the outer end portion of each jaw forming a radially extending shoulder thereon, said ring being engaged behind said radially extending shoulders and means biasing said ring axially outwardly against said shoulders.

2. A diaphragm chuck as called in claim 1 including a workpiece locator fixedly mounted on said support and projecting axially therefrom.

3. A diaphragm chuck as called for in claim 2 wherein said workpiece locator has an end face portion adapted to be axially abutted by the workpiece.

4. A diaphragm chuck as called for in claim 3 wherein the axially outer ends of said jaws are displaced in an arcuate path towards the diaphragm when the pins are displaced to grip the workpiece whereby to urge the workpiece axially into abutting engagement with said end face portion of said locator.

5. A diaphragm chuck as called for in claim 4 wherein said diaphragm has an aperture therein and said workpiece locator projects axially through said aperture.

6. A diaphragm chuck comprising a support having a central axis, a generally circular, resiliently flexible diaphragm concentric with said central axis and having its outer periphery fixedly connected to said support, actuator means on said support engageable with the diaphragm for flexing it axially about its periphery as a fulcrum, a plurality of circumferentially spaced individual jaws fixedly mounted on the diaphragm around a circle concentric with said central axis, said jaws being disposed radially inwardly from the outer periphery thereof and projecting axially outwardly from said diaphragm, the axially outer end portions of said jaws being displaced radially in an arcuate path in response to flexing of the diaphragm, a circumferentially continuous ring, means releasably mounting said ring on said jaws in a circumferentially fixed position, said ring having a plurality of radially movable pins thereon registering with said jaws, said jaws having axially extending shoulders thereon engaging one end of said pins, the opposite ends of said pins having means thereon for gripping a peripheral surface of a workpiece whereby, when the diaphragm is flexed axially in one direction, said pins are retracted sufficiently to receive a workpiece and, thereafter, when the diaphragm is flexed axially in the opposite direction, the axially extending shoulders on said jaws displace said pins radially to firmly clamp the workpiece, said ring having a plurality of flanges thereon extending radially in one direction, said jaws having flanges thereon extending radially in the opposite direction and overlying the flanges on the ring, the arcuate space between the flanges on successive jaws being greater than the arcuate extent of the flanges on the ring so that the ring can be positioned with the flanges thereon located between the flanges on the jaws and then rotated to position the flanges on the ring behind the flanges on the jaws.

7. A diaphragm chuck as called for in claim 6 including means biasing said ring axially outwardly to press the flanges on the ring against the flanges on the jaws.

8. A diaphragm chuck as called for in claim 7 including means on said support and facing axially outwardly thereof for abutting engagement with an axially inwardly facing surface of a workpiece, said flanges on the shoulders displacing said ring axially inwardly toward the abutment means on the support in response to flexing of the diaphragm to displace said pins in the work-clamping direction.

9. A diaphragm chuck as called for in claim 7 including interengageable detents and recesses on said jaws and ring for circumferentially interlocking the ring and jaws.

10. A diaphragm chuck as called for in claim 7 wherein said flanges on the ring are formed with notches therein and said jaws have radial abutments thereon engageable with said notches to circumferentially interlock said ring and jaws, said jaws having a clearance space axially behind said flanges grater than the thickness of said flanges to enable locating said ring in a plane behind the plane of said abutments by overcoming the force of said biasing means and then rotating the ring to position the notches in radial alignment with said abutments whereby, when the ring is released, it is displaced axially by said biasing means to interengage said notches and abutments.

* * * * *